Patented Dec. 6, 1949

2,490,392

UNITED STATES PATENT OFFICE 2,490,392

HYDROPYRANYL-OXAZINES, THIAZINES, OXAZOLIDINES, AND THIAZOLIDINES AND THEIR PREPARATION

Richard R. Whetstone, Berkeley, and Seaver A. Ballard, Orinda, Calif., assignors to Shell Development Company, San Francisco, Calif., a corporation of Delaware No Drawing. Application January 12, 1948, Serial No. 1,887

14 Claims. (Cl. 260—243)

This invention relates to certain novel and useful hydropyranyl-oxazines, thiazines, oxazolidines and thiazolidines and their preparation. More particularly, the present invention relates to certain novel heterocyclic compounds containing a hydropyranyl ring directly attached by a bond between saturated carbon atoms to a heterocyclic nitrogen-containing ring which contains in addition to the nitrogen atom an atom of an element of the group consisting of oxygen and divalent sulfur, and to a method for their preparation.

It has been discovered in accordance with the invention that hydropyran carboxaldehydes wherein the formyl group is directly attached to a saturated carbon atom may be caused to react as hereinafter described with amino alcohols and with amino thiols in which the amino nitrogen atom and the hydroxyl oxygen atom or the mercaptyl sulfur atom, respectively, are separated by from 2 to 3 carbon atoms of aliphatic character, to form valuable new heterocyclic compounds wherein a hydropyran group is directly attached to a heterocyclic ring composed of atoms of carbon and an atom of nitrogen and an atom of oxygen or divalent sulfur. These novel compounds, and an especially advantageous method for their preparation, form the subject of the generic aspects of the present invention.

The compounds provided by the present invention have been found to possess unusual and highly desirable characteristics. Their valuable properties are due in part to the particular character of the heterocyclic rings which are contained in their structure as the essential feature thereof, and to the specific identity of the non-carbon atoms contained in such rings. In a further part the desirable characteristics of the new compounds are due to the particular mode of attachment and the configuration of the two heterocyclic rings relative to one another and the positions of the non-carbon atoms in the heterocyclic rings and in the molecule as the whole.

The compounds to which the present invention relates in its generic concepts may be defined by reference to the structural formula

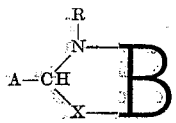

in which A represents a hydropyranyl group directly attached to the carbon atom at a saturated carbon atom of the hydropyranyl ring, X represents an atom of oxygen or of divalent sulfur, R represents an atom of hydrogen or a hydrocarbon group, and B represents a divalent aliphatic saturated hydrocarbon group which is attached to the atoms of nitrogen and oxygen or sulfur by univalent bonds which are separated by and from two to three aliphatic carbon atoms of the hydrocarbon group. When we refer to a hydropyranyl group, we intend to refer exclusively to those groups which contain the partially or the completely hydrogenated pyranyl ring, which ring as aforementioned, is directly attached to the carbon atom in the above formula at a saturated carbon atom. Representative hydropyranyl groups which may be represented by A in accordance with the generic aspects of the invention include, for example, the 2-(3,4-dihydro-1,2-pyranyl) group, the 2-tetrahydropyranyl group, the 3-tetrahydropyranyl group, the 2-(2-5-dimethyltetrahydropyranyl) group, the 2-(2,5-dimethyl-3,4-dihydro-1,2-pyranyl) group, the 2-(5-chloro-3,4-dihydro-1,2-pyranyl) group, the 4-tetrahydropyranyl group, the 2-(2,5-diethyl-3,4-dihydro-1,2-pyranyl) group, the 2-(5-methyl-3,4-dihydro-1,2-pyranyl) group, the 2-(2,5-di-isopropyltetrahydropyranyl) group, the 3-(2,6-dimethyltetrahydropyranyl) group, and homologous and analogous groups. It will be observed that the hydropyranyl group may be the unsubstituted di- or tetrahydropyranyl group, or that one or more of the hydrogen atoms thereof may have been replaced by hydrocarbon groups. However, it is essential in accordance with the invention that the hydropyranyl group contain not more than one carbon-to-carbon multiple bond in the ring, and that the ring be directly attached to the carbon atom of the above formula at a saturated carbon atom, i. e., a carbon atom that is bonded by univalent bonds to four atoms.

In accordance with a preferred embodiment of the invention, the hydropyran ring group represented by A in the above generic formula is the 2-(3,4-dihydro-1,2-pyranyl) group or a substituted 2-(3,4-dihydro-1,2-pyranyl) group. It has been discovered that the compounds within this preferred group possess especially noteworthy and desirable characteristics that render them of particular value within the broader aspects of the invention. These desirable characteristics of the preferred compounds appear to be due to their unique structure. It will be seen that the structure of the preferred compounds of the invention is characterized by the attachment together of the two heterocyclic rings by a bond between saturated carbon atoms each of which is attached directly to a non-carbon atom in its respective ring. It also will be seen that the structure of the preferred compounds is further characterized in part by the presence of a carbon-to-carbon double bond in the 5,6-position of the dihydropyranyl ring, and by the particular relative configuration of the thus unsaturated hydropyranyl ring and the second heterocyclic ring. The distinctive structure of the preferred compounds of the invention has been found to render them highly useful in certain special applications.

They may be employed advantageously as ingredients in the compounding or the preparation of pharmaceutical compositions or products. They are also useful as chemical intermediates, as ingredients in the compounding or vulcanization of rubber, as insecticides or as agents to enhance the activity of known insecticides, as materials or precoursers of materials useful in the preparation of photographic emulsions, and in like applications.

It has been discovered in accordance with the present invention that the novel compounds to which the invention relates may be prepared with advantage by reacting dihydro- and tetrahydropyran carboxaldehydes wherein the formyl group is directly attached to a saturated carbon atom with organic amino alcohols and with organic amino thiols wherein the amino nitrogen atom is separated by from two to three aliphatic carbon atoms from the hydroxyl oxygen atom or the mercaptyl sulfur atom, respectively, and wherein the amino nitrogen atom is attached to at least one atom of hydrogen, while avoiding the presence of materials or conditions which may favor undesired side reactions, such as, degradation, decomposition, condensation, polymerization, or other undesired side reactions. The desired reaction is not dependent upon the presence of catalysts. It therefore generally may be effected non-catalytically with eminently satisfactory results. The desired reaction may be favored advantageously by withdrawing from the reaction mixture water formed by the reaction at a rate substantially equal to the rate of its formation. This may be accomplished in a variety of ways. One particularly effective method comprises heating a mixture comprising the selected reactants to the boiling point, and continuously separating water from the evolved mixture prior to its return, as by reflux condensation to the liquid reaction mixture. The separation of the water most conveniently may be accomplished by heating the reaction mixture in a reaction vessel equipped with a reflux distillation column having means for separating water from the vapors and/or the condensate. By maintaining a high total reflux, the water formed by the reaction may be removed substantially as soon as it is formed, the desired reaction thereby being favored and brought to completion within a reasonable and advantageously short period of time, generally not over about 6 hours. When no more water is evolved from the reaction mixture, i. e., when the reaction is for practical purposes complete, the mixture remaining in the vessel may be treated in any suitable manner to recover the desired product. If the desired bicyclic heterocyclic product is one that is readily distillable, the reaction mixture after completion of the reaction may be subjected to fractional distillation, e. g., under reduced pressure, in order to recover the product and, if desired, any of the reactants that may be present in unreacted form. In place of fractional distillation, or or in conjunction therewith, other known methods may be employed to recover and/or to purify the desired products. For example, the less volatile compounds provided by the invention may be recovered by dissolving the reaction mixture after completion of the reaction in a suitable solvent therefore and precipitating the product by addition of a suitable non-solvent to the solution. Fractional crystallization, as from solution, sublimation, extraction with selective solvents, adsorption, etc., also are suitable methods which may be employed in appropriate cases to recover the present novel compounds from the reaction mixture and/or to further purify them.

Although the foregoing procedure is widely applicable to the preparation of the novel products to which the invention is directed, suitable modifications therein may be made as desired or as required by the nature of the specific reactants that are employed. For example, it may be desirable to include in the reaction mixture a suitable inert solvent, i. e., an organic solvent that is inert both to the reactants and to the products of the reaction. Suitable solvents include, for example, ethers, esters, hydrocarbons, heterocyclic oxygen-containing solvents, e. g., dioxane, and the like. By regulating the amount and the kind of the solvent, the reflux temperature of the reaction mixture may be controlled conveniently. Temperatures of from about 40° C. to about 200° C., preferably from about 75° C. to about 150° C., may be employed. If the solvent is one which forms an azeotrope with water, the azeotropic mixture may be separated from the reaction mixture and the solvent subsequently recovered. Additional amounts of the solvent may be added to the reaction mixture either intermittently or continuously to replace the solvent removed in the azeotropic mixture.

The water, or the azeotropic mixture containing the water, may be separated from the total vapors evolved from the reaction mixture in any suitable manner, including fractional condensation, total condensation followed by stratification, extraction, salting out, treatment with drying agents, or the like.

It is convenient to employ the reactants in approximately equimolar amounts. Alternatively, one of the reactants may be employed in an excess over the amount theoretically required in the reaction. For example, molar ratios between the reactants of from about 1:10 to 10:1 may be employed, a preferred range being from about 3:1 to 1:3. The use of an excess of one of the reactants may be desirable, for instance, when the other reactant is relatively more precious, maximum yields from the more precious reactant thereby being favored. After the reaction is completed, the unreacted excess of the reactant that is present in the greater amount may be recovered, as during fractional distillation, and reutilized if desired in the preparation of a further amount of the desired product.

The novel products to which the invention pertains may be prepared by either a continuous, an intermittent, or a batchwise type of process. Addition of the reactants to the reaction mixture may be made in one or a plurality of zones and the water formed by the reaction may be completely removed as it is formed, in one separating means, or a plurality of separating means may be employed with partial separation in each. Ordinarily there will be employed only the single pair of reactants that is required in any given instance to prepare the particular product that is desired. However, more than one hydropyrancarboxaldehyde and/or more than one amino alcohol or amino thiol may be employed, if desired, to prepare a plurality of products of the present character in the single reaction mixture. It ordinarily is highly effective to heat the reaction mixture containing the hydropyrancarboxaldehyde and the amino alcohol or amino thiol at its boiling point, say from 40° C. to 200° C., under the atmospheric pressure. However, if desired, pressures above or below the atmospheric pressure may be employed to raise or lower, respectively, the boiling point from its boiling temperature at atmospheric pressure.

The reaction which is believed to be effected in accordance with the process of the invention may be illustrated conveniently by the equation which represents the manner in which certain of the preferred compounds are formed in the process, as follows:

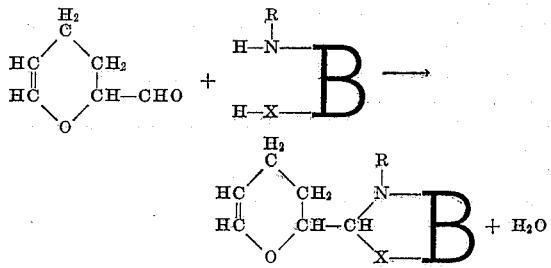

In this equation, B, R, and X have their hereinbefore defined significance. The hydropyrancarboxaldehyde is illustrated by the preferred specific member of the class, that is, by 3,4-dihydro-1,2-pyran-2-carboxaldehyde. In place of 3,4-dihydro-1,2-pyran-2-carboxaldehyde, other dihydro-, and tetrahydropyran carboxaldehydes wherein the formyl group is attached to a saturated carbon atom may be employed to prepare compounds included in the preferred or the generic aspects of the invention. Particularly useful compounds may be prepared when the hydropyranyl group of the hydropyran carboxaldehyde contains from 5 to 12 carbon atoms and only non-aromatic bonds, i. e., only carbon-to-carbon bonds that are aliphatic in character.

Organic amino alcohols and amino thiols wherein the amino nitrogen atom is attached to at least one atom of hydrogen and the nitrogen atom is separated from the hydroxylic oxygen atom or the mercaptyl sulfur atom, respectively, by from 2 to 3 carbon atoms, may be reacted with hydropyran carboxaldehydes of the hereindefined character to provide numerous useful and valuable compounds within the scope of the invention. One especially valuable group of compounds may be prepared by reacting 3,4-dihydro-1,2-pyran-2-carboxaldehyde or a lower alkyl substitution product thereof containing up to 2 lower alkyl substituent groups, with completely aliphatic amino alcohols wherein the nitrogen atom and the hydroxylic oxygen atom are separated by 3 carbon atoms. The amino alcohols desirably may contain from 3 up to 30 or even more carbon atoms, although they preferably contain from 3 to 18 carbon atoms. The products which may be thus prepared may be referred to as 2-[2-(3,4-dihydro-1,2-pyranyl)]-tetrahydro-1,3-oxazines and may be illustrated more particularly in a preferred embodiment by reference to the formula:

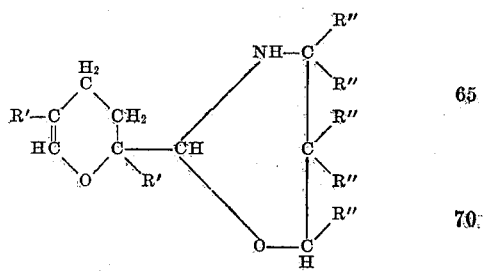

in which each R' represents a hydrogen atom or an alkyl group, preferably a lower alkyl group, and each R'' represents a hydrogen atom or an alkyl group. Illustrative compounds represented by the above formula include, among others 2-[2-(3,4-dihydro - 1,2 - pyranyl)] - tetrahydro-1,3-oxazine
2-[2-(3,4-dihydro-1,2-pyranyl)] - 4,4,6-trimethyltetrahydro-1,3-oxazine
2-[2-(3,4 - dihydro-1,2-pyranyl)] - 4,6-dimethyltetrahydro-1,3-oxazine
2-[2-(2,5-dimethyl - 3,4-dihydro - 1,2-pyranyl)]-tetrahydro-1,3-oxazine
2-[2-(3,4 - dihydro - 1,2-pyranyl)] - 4,6-diethyltetrahydro-1,3-oxazine
2-[2-(3,4-dihydro-1,2-pyranyl)]-4 - ethyl-6-isopropyltetrahydro-1,3-oxazine
2-[2-(2-methyl - 3,4 - dihydro-1,2-pyranyl)] - 5-methyltetrahydro-1,3-oxazine
2-[2-(3,4-dihydro - 1,2 - pyranyl)] - 4-methyl-6-butyltetrahydro-1,3-oxazine
2-[2-(2,5 - dimethyl-3,4 - dihydro-1,2-pyranyl)]-tetrahydro-1,3-oxazine
2-[2-(3,4-dihydro-1,2-pyranyl)] - 4,5,6-trimethyltetrahydro-1,3-oxazine
2-[2-(2,5-diethyl-3,4 - dihydro - 1,2 - pyranyl)]-4,6-dioctyltetrahydro-1,3-oxazine
2-[2-(3,4 - dihydro-1,2 - pyranyl)]-4 - hexyl-6-octyltetrahydro-1,3-oxazine
2-[2-(-methyl-3,4 - dihydro-1,2-pyranyl)]-4,5,6-tripropyltetrahydro-1,3-oxazine
2-[2-(2-ethyl-3,4-dihydro-1,2-pyranyl)] - tetrahydro-1,3-oxazine
2-[2-(3,4 - dihydro - 1,2-pyranyl)]-6-octyltetrahydro-1,3-oxazine
2-[2-(3,4 - dihydro-1,2 - pyranyl)] - 5-methyl-6-hexyltetrahydro-1,3-oxazine
2-[2-(2,5 - dimethyl - 3,4-dihydro-1,2-pyranyl)]-4,6-dipentyltetrahydro-1,3-oxazine
2-[2-(3,4 - dihydro-1,2 - pyranyl)]-4,6-endoethylenetetrahydro-1,3-oxazine
2-[2-(3,4-dihydro - 1,2 - pyranyl)] - 4,6-dioctyltetrahydro-1,3-oxazine
2-[2-(3,4 - dihydro-1,2 - pyranyl)]-6-butyltetrahydro-1,3-oxazine
2-[2-(3,4-dihydro - 1,2-pyranyl)]-4-pentyltetrahydro-1,3-oxazine
2-[2-(2,5-diisopropyl-3,4-dihydro-1,2-pyranyl])-4,6-diethyltetrahydro-1,3-oxazine A further valuable and highly useful group of compounds may be prepared by reacting hydropyran carboxaldehydes as defined immediately above with completely aliphatic amino alcohols wherein the amino nitrogen atom is separated from the hydroxyl oxygen atom by two carbon atoms. The products which may thus be prepared may be referred to as 2-hydropyranyloxazolidines. An especially valuable group of hydropyranyl oxazolidines may be prepared by reacting 3,4-dihydro-1,2-pyran-2-carboxaldehyde or a lower alkyl substituent thereof containing up to two lower alkyl substituent groups with completely aliphatic amino alcohols, which contain from 2 to 18 carbon atoms and wherein the amino nitrogen atom is separated from the hydroxyl oxygen atom by two carbon atoms. The products which may be thus prepared may be referred to as 2-[2-(3,4-dihydro-1,2 - pyranyl)]-oxazolidines and the members of a preferred group may be illustrated more particularly by reference to the formula

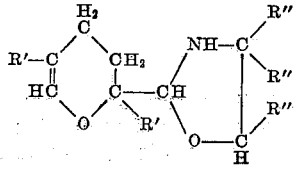

in which each R' represents a hydrogen atom or a lower alkyl group, and each R'' represents a hydrogen atom or an alkyl group. Illustrative compounds represented by the above formula, include, among others, 2-[2-(3,4-dihydro-1,2-pyranyl)]-oxazolidine
2-[2-(3,4-dihydro-1,2-pyranyl)]-4-methyloxazolidine
2-[2-(3,4-dihydro-1,2-pyranyl)]-5-methyloxazolidine
2-[2-(3,4-dihydro-1,2-pyranyl)]-4,5-dimethyloxazolidine
2-[2-(3,4-dihydro-1,2-pyranyl)]-4-ethyl-5-propyloxazolidine
2-[2-(2,5-dimethyl-3,4-dihydro-1,2-pyranyl)]-4,5-dimethyloxazolidine
2-[2-(5-methyl-3,4-dihydro-1,2-pyranyl)]-4,5-dipropyloxazolidine
2-[2-(2-methyl-3,4-dihydro-1,2-pyranyl)]-oxazolidine
2-[2-(3,4-dihydro-1,2-pyranyl)]-4-hexyloxazolidine
2-[2-(2-ethyl-3,4-dihydro-1,2-pyranyl)]-5-pentyloxazolidine
2-[2-(2-ethyl-3,4-dihydro-1,2-pyranyl)]-5-octyloxazolidine
2-[2-(3,4-dihydro-1,2-pyranyl)]-4-methyl-5-hexyloxazolidine
2-[2-(2-ethyl-3,4-dihydro-1,2-pyranyl)]-4-isopropyl-5-ethyloxazolidine
2-[2-(2,5-dimethyl-3,4-dihydro-1,2-pyranyl)]-4-octyloxazolidine The 2-[2-(3,4-dihydro-1,2-pyranyl)]-oxazolidines and the 2-[2-(3,4-dihydro-1,2-pyranyl)]-tetrahydro-1,3-oxazines which contain from 12 to 30 carbon atoms, especially those which contain a plurality of alkyl groups attached to carbon atoms of the nitrogen-containing heterocyclic ring, are particularly useful, among other reasons, as intermediates for the preparation of nitrogenous organic compounds which heretofore could have been prepared only with considerable difficulty and expense.

A further group of novel bicyclic heterocyclic compounds of the present invention which may be prepared according to the process of the invention is represented by the 2-hydropyranyl tetrahydro-1,3-thiazines and the 2-hydropyranyl thiazolidines wherein the heterocyclic rings are joined by a univalent bond between saturated carbon atoms. The compounds within this group may be prepared by reacting a hydropyran carboxaldehyde, especially 3,4-dihydro-1,2-pyran-2-carboxaldehyde or a lower alkyl substitution product thereof, with amino thiols wherein the amino nitrogen atom is separated from the mercaptyl sulfur atom by from 2 to 3 carbon atoms. An especially valuable group of compounds may be prepared by reacting the said dihydropyran carboxaldehyde or a 2-and/or 5-lower alkyl substitution product thereof with completely aliphatic amino thiols of the above designated character which contain from 2 to 18 carbon atoms. The compounds which thus may be prepared may be illustrated in a preferred embodiment by reference to the following structural formula

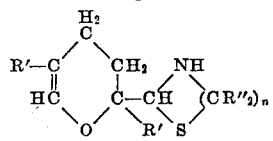

in which each R' represents a hydrogen atom or a lower alkyl group and each R'' represents a hydrogen atom or an alkyl group, and $n$ represents 2 or 3, the groups $(CR''_2)$ being the same or different. Representative compounds which have structures corresponding to the immediately foregoing structural formula include among others, the following 2-[2-(3,4-dihydro-1,2-pyranyl)]-4-methylthiazolidine
2-[2-(3,4-dihydro-1,2-pyranyl)]-5-methylthiazolidine
2-[2-(2,5-dimethyl-3,4-dihydro-1,2-pyranyl)]-4-ethylthiazolidine
2-[2-(2-methyl-3,4-dihydro-1,2-pyranyl)]-4-propylthiazolidine
2-[2-(3,4-dihydro-1,2-pyranyl)]-4-isopropylthiazolidine
2-[2-(2,5-dimethyl-3,4-dihydro-1,2-pyranyl)]-4-pentylthiazolidine
2-[2-(3,4-dihydro-1,2-pyranyl)]-tetrahydro-1,3-thiazine
2-[2-(3,4-dihydro-1,2-pyranyl)]-5-methyltetrahydro-1,3-thiazine
2-[2-(3,4-dihydro-1,2-pyranyl)]-4,4,6-trimethyltetrahydro-1,3-thiazine
2-[2-(3,4-dihydro-1,2-pyranyl)]-4,6-diethyltetrahydro-1,3-thiazine
2-[2-(2,5-dimethyl-3,4-dihydro-1,2-pyranyl)]-tetrahydro-1,3-thiazine
2-[2-(2-methyl-3,4-dihydro-1,2-pyranyl)]-4,6-dimethyltetrahydro-1,3-thiazine
2-[2-(2-methyl-3,4-dihydro-1,2-pyranyl)]-4-ethyltetrahydro-1,3-thiazine
2-[2-(3,4-dihydro-1,2-pyranyl)]-5-butyltetrahydro-1,3-thiazine The following examples will illustrate the preparation of compounds which are illustrative of the groups of compounds to which the invention relates. In the examples, the parts are by weight.

*Example I*

A mixture of 74 parts of 2-methyl-2-amino-4-pentanol and 67 parts of 3,4-dihydro-1,2-pyran-2-carboxaldehyde with one hundred parts of benzene was prepared in a glass lined reaction vessel which was equipped with a reflux condenser having a phase-separating head attached. The mixture was heated to the boiling point and refluxed with withdrawal of water at the phase separating head and return of the organic portion of the condensate to the reaction mixture until the evolution of water ceased. After completion of the reaction the reaction mixture was fractionally distilled under reduced pressure. The desired product, 2-[2-(3,4-dihydro-1,2-pyranyl)]-4,4-6-trimethyltetrahydro-1,3-oxazine, was recovered in a yield of 95% of theory as the fraction distilling from 92° C. to 94° C. under pressure of about 2.5 millimeters of mercury. The fraction was found to have a refractive index $(n_D^{20})$ of 1.4800. The product was analyzed and found to contain 68.18% carbon, 9.89% hydrogen, and 6.53% nitrogen compared to values of 68.21% carbon, 10.02% hydrogen, and 6.63% nitrogen calculated for the formula $C_{12}H_{21}O_2N$. The product was found to have a basicity (determined by titration with perchloric acid to the end point of methyl violet) of 0.474, the theoretical value. The formula of the product is as follows

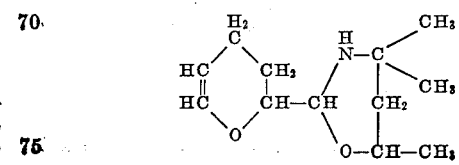

Example II

Seventy parts of 2,5-dimethyl-5,6-dihydro-1,2-pyran-2-carboxaldehyde and 59 parts of 2-amino-2-methyl-4-pentanol were reacted in the presence of benzene according to the method of Example I. There were obtained 109 parts of 2-[2-(2,5-dimethyl-3,4-dihydro-1,2-pyranyl)]-4,4,6-trimethyltetrahydro-1,3-oxazine, corresponding to a yield of 92% of theory. The product was found to have a boiling point of 97° to 98.2° C. under a pressure of 2 millimeters of mercury, and to have a refractive index ($n_D^{20}$) of 1.4760.

Example III

Sixty-seven parts of 3,4-dihydro-1,2-pyran-2-carboxaldehyde and 53.5 parts of 2-amino-2-methyl-1-propanol were reacted in benzene according to the method employed in the preceding examples. There were obtained from the reaction mixture 98 parts, corresponding to a yield 89% of theory, of 2-[2-(3,4-dihydro-1,2-pyranyl)]-4,4-dimethyloxazolidine. The product thus prepared was found to have a boiling point of 81° to 82° C. under a pressure of 2 millimeters of mercury, and to have a refractive index ($n_D^{20}$) of 1.4793.

Example IV

Reaction between 90 parts of 3,4-dihydro-1,2-pyran-2-carboxaldehyde and 49 parts of ethanolamine effected according to the method employed in the preceding examples, resulted in the recovery of 85 parts (69% yield) of 2-[2-(3,4-dihydro-1,2-pyranyl)]-oxazolidine having a boiling point of 86° to 88° C. under a pressure of 2 millimeters of mercury, and a refractive index ($n_D^{20}$) of 1.4995.

By reacting in a similar manner 3,4-dihydro-1,2-pyran-2-carboxaldehyde and 2-aminoethanethiol there may be prepared 2-[2-(3,4-dihydro-1,2-pyranyl)]-thiazolidine; similarly, 2-[2-(2,5-dimethyl-3,4-dihydro-1,2-pyranyl)]-5-ethyltetrahydro-1,3-thiazine may be prepared by reacting 2,5-dimethyl-3,4-dihydro-1,2-pyran-2-carboxaldehyde with 3-amino-2-methylpropanethiol; 2-[2-(2-methyl-3,4-dihydro-1,2-pyranyl)]-5-methylthiazolidine may be prepared by reacting 2-methyl-3,4-dihydro-1,2-pyran-2-carboxaldehyde with 1-amino-2-propanethiol; and 2-[2-(3,4-dihydro-1,2-pyranyl)] tetrahydro-1,3-thiazine may be prepared by reacting 3,4-dihydro-1,2-pyran-2-carboxaldehyde with 2-amino propanethiol.

This application concerns subject matter which is related to the subject matter of the copending application, Serial No. 713,455, filed December 2, 1946, now Patent 2,479,283, by one of the present applicants. Reference also is made to the copending application, Serial No. 735,029, filed March 15, 1947, now Patent 2,479,284, a continuation-in-part of the aforesaid application Serial No. 713,455. These applications filed by Richard R. Whetstone relate to the preparation of hydropyran carboxaldehydes.

We claim as our invention:

1. 2-[2-(3,4-Dihydro-1,2-pyranyl)]-4,4,6-trimethyltetrahydro-1,3-oxazine.

2. A 2-[2-(3,4-dihydro-1,2-pyranyl)]-polyalkyltetrahydro-1,3-oxazine.

3. A 2-[2-(3,4-dihydro-1,2-pyranyl)] tetrahydro-1,3-oxazine, said dihydropyranyl group being the unsubstituted 2-(3,4-dihydro-1,2-pyranyl) group.

4. The process which comprises reacting 3,4-dihydro-1,2-pyran-2-carboxaldehyde with 2-methyl-2-amino-4-pentanol at a temperature between about 40° C. and about 200° C., withdrawing water from the reaction mixture substantially as rapidly as it is evolved, and recovering 2-[2-(3,4-dihydro-1,2-pyranyl)]-4,4,6-trimethyltetrahydro-1,3-oxazine from the mixture.

5. The process which comprises reacting 3,4-dihydro-1,2-pyran-2-carboxaldehyde with a completely aliphatic amino alcohol wherein the amino and hydroxyl groups are separated by 3 carbon atoms in direct chain linkage, at a reaction temperature between about 40° C. and about 200° C., withdrawing water from the reaction mixture substantially as rapidly as it is formed and recovering a 2-[2-(3,4-dihydro-1,2-pyranyl)]-tetrahydro-1,3-oxazine from the mixture.

6. A compound having a structure represented by the formula

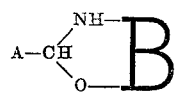

in which A represents a hydropyranyl group attached to the carbon atom at a saturated carbon atom in the hydropyranyl ring, and B represents a divalent aliphatic saturated hydrocarbon group completing the heterocyclic ring in which the atoms of nitrogen and oxygen are separated through said hydrocarbon group by from 2 to 3 carbon atoms in direct linkage.

7. A compound having a structure represented by the formula

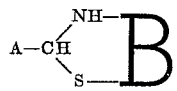

in which A represents a hydropyranyl group attached to the carbon atom at a saturated carbon atom in the hydropyranyl ring, and B represents a divalent aliphatic saturated hydrocarbon group completing the heterocyclic ring in which the atoms of nitrogen and sulfur are separated through said hydrocarbon group by from 2 to 3 carbon atoms in direct linkage.

8. A compound having a structure represented by the formula

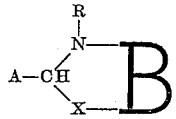

in which A represents a hydropyranyl group attached to the carbon atom at a saturated carbon atom in the hydropyranyl ring, X represents one of the group consisting of oxygen and sulfur, B represents a divalent hydrocarbon group completing the heterocyclic ring in which the atom of nitrogen and the atom represented by X are separated through said hydrocarbon group by from 2 to 3 carbon atoms in direct linkage, and R represents one of the class consisting of the hydrogen atom and the hydrocarbon groups.

9. The process of preparing a compound defined in claim 8 which comprises reacting a hydropyran carboxaldehyde wherein the formyl group is attached to a saturated carbon atom in the hydropyran ring with a member of the group consisting of the amino alcohols and amino thiols wherein the amino group and the hydroxyl and thiol groups, respectively, are separated by from 2 to 3 carbon atoms in direct linkage, at a reaction temperature between about 40° C. and about 200° C., withdrawing water from the reaction mixture substantially as rapidly as formed, and recovering said compound from the mixture.

10. A 2-[2-(3,4 - dihydro-1,2-pyranyl)]-tetrahydro-1,3-thiazine, said dihydropyranyl group being the unsubstituted 2 - (3,4 - dihydro-1,2-pyranyl) group.

11. A 2-[2-(3,4-dihydro - 1,2-pyranyl)]-tetrahydro-1,3-thiazine.

12. A 2-[2-(3,4 - dihydro-1,2-pyranyl)]-oxazolidine.

13. A 2-[2-(3,4 - dihydro-1,2-pyranyl)]-oxazolidine, said dihydropyranyl group being the unsubstituted 2-(3,4-dihydro-1,2-pyranyl) group.

14. 2-[2-(3,4 - Dihydro-1,2-pyranyl)]-oxazolidine.

RICHARD R. WHETSTONE.
SEAVER A. BALLARD.

REFERENCES CITED

The following references are of record in the file of this patent:

UNITED STATES PATENTS

| Number | Name | Date |
|---|---|---|
| 2,243,295 | Susie et al. | May 27, 1941 |